Figure 1:
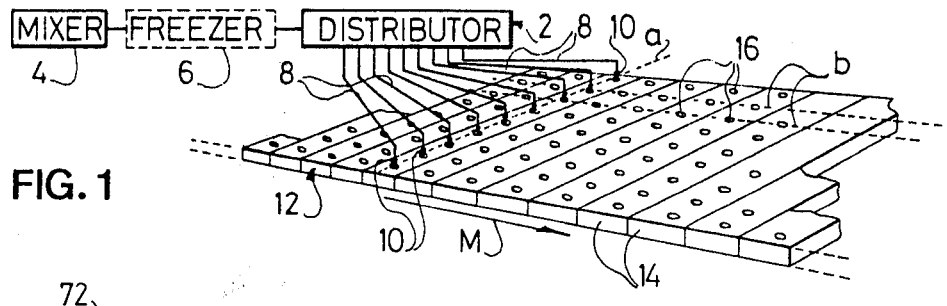

United States Patent [19]

Waldström et al.

[11] 4,417,610

[45] Nov. 29, 1983

[54] DISPENSER SYSTEMS

[75] Inventors: Ejvind Waldström, Hundslund; Gerhard Kaufmann, Viby J., both of Denmark

[73] Assignee: O.G. Hoyer A/S, Hojbjerg, Denmark

[21] Appl. No.: 249,413

[22] Filed: Mar. 31, 1981

[51] Int. Cl.³ .............................................. B65B 3/10
[52] U.S. Cl. ..................................... 141/91; 141/188; 141/192; 222/55; 222/61
[58] Field of Search ................................ 141/129–191, 141/94–96, 12 S, 1–12, 69–83, 250–284, 192, 89, 90, 91; 222/55, 61

[56] References Cited

U.S. PATENT DOCUMENTS

| | | | |
|---|---|---|---|
| 2,765,601 | 10/1956 | Anderson | 141/188 |
| 3,196,810 | 7/1965 | Roth | 141/188 |
| 3,328,937 | 7/1967 | Newman et al. | 141/186 |
| 3,419,052 | 12/1968 | Morine | 141/188 |
| 3,788,370 | 1/1974 | Hare et al. | 141/125 |
| 4,315,532 | 2/1982 | Elsworth | 141/186 |

Primary Examiner—Houston S. Bell, Jr.
Attorney, Agent, or Firm—Antonelli, Terry & Wands

[57] ABSTRACT

A system for dispensing a viscid medium from a supply medium flow to a number of receptacles, with the system including a filling station and a distributor having an inlet for a pressurized supply medium flow and a number of outlets individually connected to a series of dispenser openings located in the filling station. A support is provided for sequentially moving consecutive groups of receptacles through the filling station to align a single receptacle of each group with the respective dispenser openings. An outlet valve arrangement is located in a path of the medium flow upstream of the dispenser openings. A valve control is operable to repeatingly open and close the outlet valve arrangement to allow concurrent medium outlet from the dispenser openings during an opening time interval corresponding to a predetermined medium volume being dispensed for a required filling of the receptacles of the respective consecutive groups. A pressure sensor is located upstream of the outlet valve with an arrangement being operatively connected with the pressure sensor and the valve control for effectively adjusting a length of the opening time interval as a function of a variation of an average medium pressure between consecutive operation cycles of the outlet valve arrangement so that consecutive receptacles are caused to receive substantially uniform volumes of the medium regardless of general gradual changes of the pressure of the viscid medium.

15 Claims, 4 Drawing Figures

DISPENSER SYSTEMS

The present invention relates to methods and means for intermittently and repeatedly dispensing viscid media such as viscid ice cream, from a medium source through a distributor unit to a plurality of receptacles such as mold pockets in an ice cream bar freezer machine or sales packings for the medium in question, whereby it is desired that uniform amounts of medium be supplied to the various receptacles, both concurrently and successively by the intermittent operation of the dispensing system.

For the concurrent uniform filling of a plurality of receptacles in a reasonably simple manner it is important that the said distributor is able to evenly subdivide the received medium flow into the required number of uniform individual flows to the single receptacles, and that outflow control means are provided to start and stop the outflow to the receptacles such that the effective filling time corresponds to the receptacles being filled to the desired uniform degree as conditioned by the intensity of the said individual flows.

Once these conditions are fulfilled it will be a further requirement for the said intermittent or successive filling of further sets or pluralities of receptacles that the intensity of the individual outflows is maintained constant during the operation hours or that the said effective filling time is adjusted complementary to the possible variations of the outlet flow intensity or outflow volume velocity of the medium.

In the prior art, unless a complicated volumetric filling system has been used, these various requirements for an ideal filling of the receptacles have not generally been taken full into account, and it has been common practice to make use of a very simple dispensing equipment and accept that the receptacles are filled with a relatively low degree of accuracy pertaining to both the simultaneous filling of a set of receptacles and the timely spaced fillings of successive sets of receptacles.

However, some viscid substances such as a newly developed ice cream material having a high contents of gelatine, show expressed tendencies to undergo viscosity variations both successively in a continuous production and even concurrently, between different portions of the cross section of the supply flow of the material. Thus, when the supply flow is divided into the said distributor unit and fed to the receptacles through individual pipes or hoses, the result may be a non-uniform filling of the receptacles.

According to the Danish Patent Specification No. 140.123 it already has been suggested to design the distributor unit so as to promote a uniform viscosity in the different outlet conduits from the distributor. This distributor is made as a cylindrical housing having an inlet at one end and a circular row of outlet holes in the opposite end, and inside the housing is arranged a rotor having radially projecting wings which are located close to the inside of said opposite housing end so as to be rotated along the row of outlet holes and thus repeatedly sweep across the inner ends of the outlet holes. This system has proved successful as far as an equalization of the viscosity in the different outlet conduits is concerned, but various other problems still exist.

It is an object of this invention to provide an improved and simple multiple dispensing system for viscid media, which is operable to successively effect a simultaneous filling of a plurality of receptacles in a substantially uniform manner despite possible viscosity variations of the viscid medium throughout the operation hours.

It is a further object of the invention to provide a multiple dispensing system which is well suited to handle viscid media containing particles or lumps of semi rigid material such as lumps of fruits or nougat.

Still a further object of the invention is to provide a multiple dispensing system which is additionally well suited to be cleaned according to the CIP-principle (cleaning-in-place), such that an effective cleaning may be achieved by way of a flow of cleaning liquid through the system, without any need of taking the system more or less apart.

Figure 2:
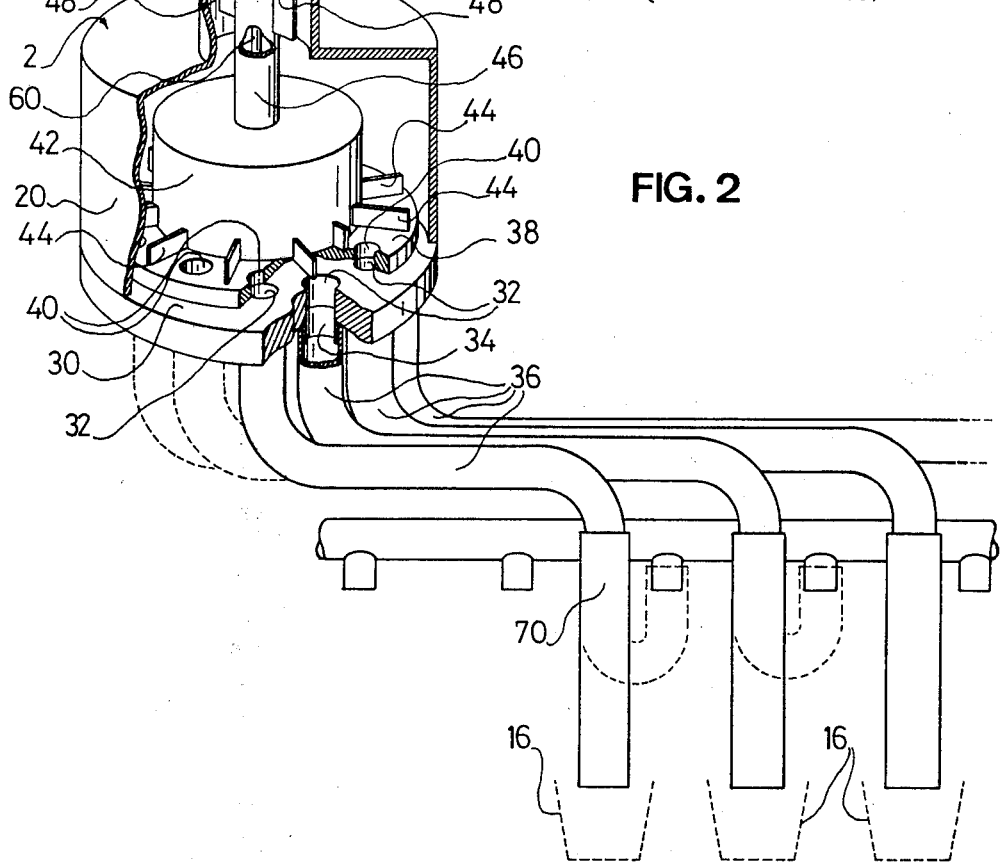
Figure 3:
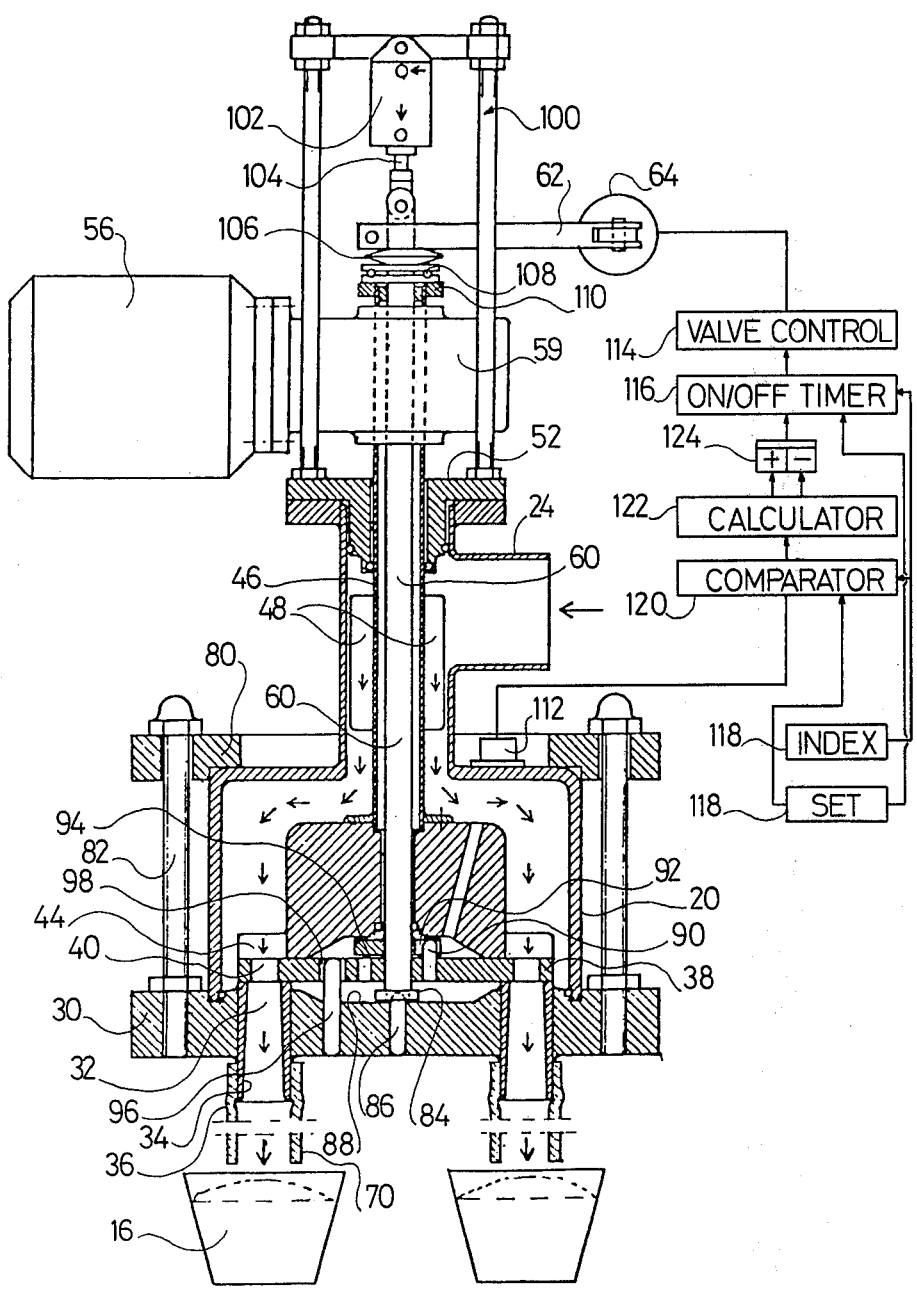
Figure 4:
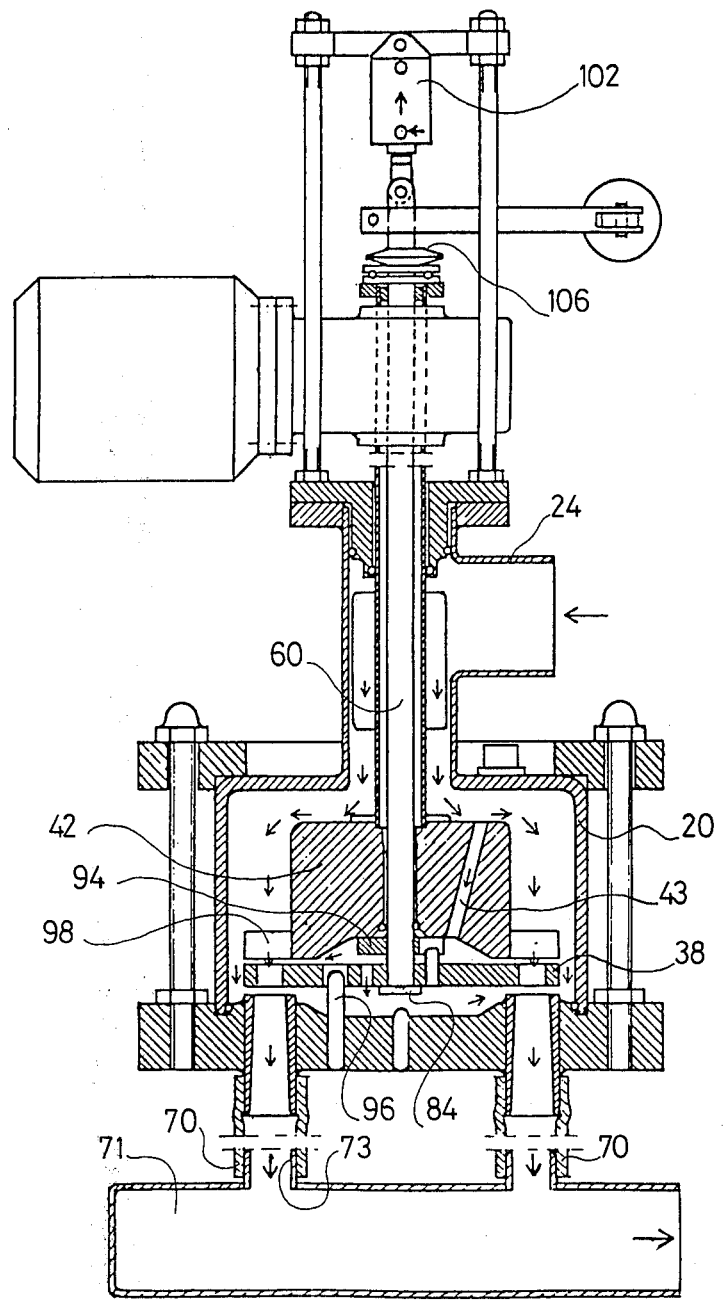

These and other objects and advantages of the invention will be more fully described in the following with reference to the accompanying drawings, in which:

FIG. 1 is a schematic view of a dispenser system for sequentially filling consecutive rows of receptacles, FIG. 2 is a more detailed view, partly in section, of a distributor unit according to the invention as used in such a system, FIG. 3 is a still more detailed sectional view of the distributor, and FIG. 4 is a corresponding view of the distributor as being cleaned.

In FIG. 1 is schematically shown a dispenser system comprising a distributor generally designated by the reference numeral 2 receiving a flow of viscid material from a mixer 4, if revelent through a freezer 6, and distributing the material flow uniformly to a plurality of outlet conduits 8, the outlet ends 10 of which are arranged on a straight line a transversely above a moving table mold structure generally designated by the reference numeral 12, which is illustrated as made of juxtaposed long elements 14, each provided with a row of mold cavities or receptacles 16, e.g. for ice cream bars. The receptacles 16 of the various elements 14 are arranged in parallel rows b extending in the direction of movement of the table structure as shown by an arrow M. In operation, all receptacles 16 of one element 14, i.e. one transverse row of receptacles of the table structure 12, are filled from the outlets 10 when located in the filling station represented by the line a, and then the table structure 12 is indexed to bring the subsequent element 14 into the filling station, and so forth, this being a well known type of operation. The structure 12 may be a rotary table, and the dispenser outlets 10 may be arranged reciprocally in the moving direction of the underlying receptacles to enable continuous movement of the table. The receptacles 16 may be constituted by individual sales packings arranged in the required row pattern on a movable support table, all as known in the art.

In normal operation, for enabling the successive filling of the consecutive rows of receptacles 16, the outlet flow of viscid material through the dispenser outlets 10 should be controlled by valve means (not shown in FIG. 1), which for simplicity and for a high capacity of the dispenser system should operate so as to start and stop the outflow through all the outlets 10 in a simultaneous manner. Under this condition it should be endeavoured to secure a well defined and uniform volume velocity of the viscid material through the various outlets 10 in order to achieve a uniform degree of filling of the receptacles, and as already mentioned this uniformity should apply to both the concurrent filling of the various receptacles in the filling station and to the successive filling of the consecutive rows of receptacles throughout the operation hours.

The said Danish Patent Specification No. 140.123 discloses a distributor unit which is designed so as to promote the uniformity of the concurrent outlet flows through the outlets 10 even when the viscosity of the supply flow of material is not uniform all over the cross section of this flow, and a distributor of such a design is illustrated in FIG. 2.

The distributor shown in FIG. 2 comprises a cylindrical housing 20, the top side of which is provided with a central, upwardly projecting cylindrical portion 22 of reduced diameter and connected with a lateral inlet pipe 24, which receives cold ice cream material from a continuous freezer 26 serving to pre-cool the material as delivered from a mixer 28. The viscid material is supplied to the distributor 2 at a considerable pressure, e.g. some 5 atm. The bottom wall of the housing 20 is a disc 30, in which there is provided a circular row of holes 32, each connected with a lower pipe stub 34, to which the respective outlet conduits 8 of FIG. 1 are connectable, here represented by hoses 36.

On the bottom disc 30 is placed a concentric valve disc 38 having a circular row of holes 40, which are a little narrower than the bottom holes 32 and in the position shown in FIG. 2 are located axially aligned with the bottom holes 32. In engagement with the top side of the valve disc 38 is located a cylindrical rotor block 42 having at its lower end a plurality of radial wings 44, which project radially over the annular area in which the holes 40 are provided. Topwise the rotor block 42 is connected with a tubular shaft 46 projecting upwardly through the upper cylindrical portion 22 and inside this portion provided with radial wings 48. The tubular shaft 46 projects upwardly through a rotation bearing 50 in a top cover 52 on the cylindrical portion 22, and above the top cover 52 the shaft 46 is connected with suitable means for rotating the shaft, e.g. provided with a pulley 54 driven by a motor 56 through a driving belt 58. Centrally in the hollow shaft 46 is arranged a rod 60, which is bottomwise rigidly connected with the center of the valve disc 38 and topwise provided with a radial arm 62, the outer end of which is connected with a stationary control cylinder 64 operable to change the angular position of the radial arm 62 and therewith to rotate the valve disc 38 between the open position shown, in which the valve holes 40 are aligned with the respective bottom holes 32, and a closed position, in which the valve holes 40 are entirely offset from the bottom holes 32, whereby the outlet through the bottom holes will of course be stopped. Because a viscid material is in question, this will amount to stoppage of the material outflow through the dispenser outlets in general. The outlet pipes or hoses 36 are shown to be connected to respective outlet mouthing tube members 70 corresponding to the outlets 10 in FIG. 1 and located correspondingly aligned above the relevant row of receptacles 16 as present in the filling station.

The cylinder 64 controlling the opening and closing operation of the valve disc 38 is connected with a control unit 72. Though generally the very distributor 2 as shown in FIG. 2 belongs to the prior art it is nevertheless a feature of the present invention that the operation of the control cylinder 64 or any other actuator means for operating the valve disc 38 is operatively connected with the driving means for the indexing of the rows of receptacles 16 past the filling station in such a manner that the indexing of the receptacle rows (movement of table 12 of FIG. 1) is the primary operation, i.e. the valve disc 38 is caused to be operated in simple accordance with or dependency of a timely uniform indexing of the rows of receptacles 16. This feature of the invention may apply even to a system in which the outlet valve operation is not integrated in the simultaneous opening and closing function of a single valve member 38, but is effected individually for each outlet by way of individually controllable valve means in the single outlet conduits.

During the operation of the system shown in FIG. 2 the rotor block 42 is rotated at moderated speed, e.g. with a speed of some one revolution per second, whereby the flow of the viscid material will be divided evenly to and through the outlet holes 32, when the valve disc 38 assumes its "open position", irrespective of any possible non-uniformity in the viscosity of the viscid medium throughout the cross section of the flow thereof.

It will be understood, however, that the system so far described is unable to produce a constant volume velocity of the outlet flows of the viscid material, if during the operation hours the supply medium flow from the freezer 26 undergoes changes of pressure or viscosity, e.g. due to even small temperature changes inside the freezer 26 or along the conduit 24, since such changes may effect the outflow intensity considerably. Therefore, when as mentioned the valve disc 38 or corresponding valve means is operated in simple time synchronism with the primary indexing of the rows of receptacles 16 it may well happen that the actual material outlet per filling time sequence changes from time to time.

According to the present invention means are provided for controlling the operation of the outlet valve means in response to variations of the average pressure in the viscid medium upstream of the valve means, such that the effective opening period of the valve means for each dispensing operation is caused to be adjusted complementary to the adverse effect on the outlet flow as caused by the said changes of the condition of the supply medium, the control being effected or adjusted so as to hereby cause a substantially constant volume of the material to pass the valve means during each dispensing period. Should for some reason the viscosity of the medium show a tendency to change during the operation the medium outflow to the receptacles 16 will be correspondingly easier or tardier, thus tending to cause an increase or decrease, respectively, of the medium volumes as dispensed during each filling cycle. However, with the said pressure responsive valve operation control it is possible to automatically adjust the discharge of the medium so as to secure a substantially uniform sequential filling of the receptacles 16 throughout the working hours of the dispensing system.

The possible pressure variations in the viscid medium will be particularly pronounced when according to a preferred embodiment the medium is supplied via a continually operating positive displacement pump, placed e.g. in direct connection with the outlet of the mixer 28 or the outlet of the freezer 26. In such a system the pressure of the viscid medium in the conduit between the discharge port of the pump and the valve means will fluctuate rather drastically during the sequential operation of the valve means, unless special expansion means are provided somewhere in the system. However, when the medium is of a type having a certain contents of air, and when the operative "close"

periods of the valve means are reasonably short, then it is in fact possible to rely on the compressibility of the viscid medium and perhaps a small expansibility of the entire conduit portion between the pump and the valve means, such that the medium pressure during the "close" periods of the valve means will not rise beyond an acceptable magnitude.

In a practical example the indexing cycle time of the mold table 12 (FIG. 1) is 2-5 seconds, and during each cycle the outlet valves are operated approximately in on/off mode and are kept open for about one second, i.e. kept closed for about another 1-4 seconds, whereby the medium pressure inside the distributor housing 20 (FIG. 2) rises to some 6 atm. just before the valve holes 40,32 are opened, whereafter the pressure falls to some 2 atm. just before the closing of the valve means. The said pressure responsive control means for changing the operation of the valve means should not respond to these operational pressure fluctuations, which occur with a relatively high frequency.

The said changes of the general pressure condition of the medium during the operation hours will normally be within a magnitude range such smaller than the operative pressure fluctuations, and a general change of just a few percent will give rise to a considerable change of the degree of filling of the receptacles, once the various parameters have been adjusted to correct filling. A general pressure change causes the same change in second power of the outlet flow when the valves are open.

In order to detect a general pressure change without any substantial influence from the said operational changes it is possible to repeatedly measure the pressure almost momentarily at some fixed moment or phase point of each operation cycle, preferably immediately before the opening of the outlet valve means or/and immediately before or after the closing of the valve means. When the measuring results start to deviate from the value according to the original adjustments this will be indicative of a changed pressure and therewith a changed filling dosage per operation cycle, and the latter change is then counteracted by causing the measured pressure change to affect the control of the opening and/or closing of the outlet valve means so as to effectively change the filling time per cycle for readjustment of the dosage under the new pressure conditions.

A basic adjustment of the control means may be carried out empirically for determining the correct degree of adjustment of the valve operation in response to varying pressure conditions for achieving a substantially uniform degree of filling of the receptacles.

FIG. 3 is a sectional view of a modified distributor of the same basic design as shown in FIG. 2. The housing 20 is made pressure proof by means of an upper annular yoke 80 clamped against the top of the housing by means of connector bolts 82 secured to a radially extended edge portion of the bottom disc 30. To the lower end of the central shaft 60 is rigidly secured a radially protruding disc 84 which rests loosely on the top end of a carrier pin 86 in a central depression 88 in the top side of the heavy bottom disc 30. The valve disc 38 has an eccentrically arranged, upwardly projecting pin 90, which is loosely received in an aperture 92 of a driving member 94 rigidly secured to the shaft 60, while this shaft itself passes freely through a central hole in the valve disc 38. An eccentrically located, vertical pin 96 projects upwardly from the bottom disc 30 and into an arcuate slot 98 in the valve disc 38, the ends of this slot being located so as to define together with the pin 96 the respective open and closed positions of the valve disc 38 in response to the disc 38 being rotated forth and back by the shaft 10, which transmits its rotation to the disc 38 through the driving member 94 and the pin 90. In operation, the lower end of the shaft 60 is urged against the bottom disc 30, whereby it is centered thereon by way of the rigid center pin 86 engaging into a central bottom cavity of the disc 84 to thereby stabilize and center even the valve disc 38 and the rotor block 42.

In FIG. 3 the driving arrangement of the tubular shaft 46 of the rotor block 42 comprises the motor 56, which is here coupled to a worm reduction gear 59 driving on the outside of the tubular shaft 46 in an axially displaceable manner.

To the top end of a rigid gallows generally designated by the reference numeral 100 is secured one end of a vertical pneumatic cylinder 102, the piston rod 104 of which is secured to the top end of the central shaft 60. As in FIG. 2 the shaft 60 is rotatable by means of a radial arm 62 and a working cylinder 64. On and about the shaft 60, abutting the underside of the radial arm 62, is mounted a compression spring member 106 for exerting a downward bias onto a pressure bearing 108, which is rested on a collar portion 110 at the top end of the tubular shaft 46.

In operation of the distributor the uppermost cylinder 102 urges the central shaft 60 downwardly against the central bottom pin 86, the shaft 60 still being rotatable by the radial arm 62, and the spring member 106 correspondingly urges the rotor block 42 downwardly, through the tubular shaft 46, whereby also the valve disc 38 is forced downwardly; in operation, however, the valve disc is held against the bottom disc 30 already by the internal pressure in the housing 20 because of the lower pressure in the outlet holes 32, these holes being slightly wider than the valve disc holes 40.

In operation, therefore, a major effect of the spring member 106 is to urge the rotor block 42 and its wings 44 against the top side of the valve disc 38. Compared with the said known distributor according to FIG. 2 the distributor of FIG. 3 comprises the improvement that the lower edges of the wings 44 are ground so as to constitute real cutter members as they pass across the upper ends of the valve holes 40, urged thereagainst by the action of the spring member 106.

This is an important improvement because many types of viscid media to be handled by a relevant dispensing system contain semi rigid particles or lumps such as nougat, fruit pieces, etc., and in known distributors such particles have caused many troubles, because they tend to form collections adjacent the edges of narrow outlet holes. Therefore, the additional use of the wings 44 as real cutters is advantageous in that such particle collection tendencies are effectively counteracted in a constant manner during the operation of the distributor.

A pressure guage 112 is mounted in the top side of the housing and is connected to a control circuit which, by way of example, may be designed as follows, as illustrated in FIG. 3:

The actuator cylinder 64 of the valve disc 38 is operated by a valve control unit 114 such as a solenoid valve controlled by an on/off timer 116. The control unit 114 may be a switch over unit if the cylinder 64 is double acting, or it may be an on/off valve if the radial arm 62 is swung one way by means of the cylinder 64 and the opposite way by means of a suitable return spring bias (not illustrated). The timer 116 receives a train of synchronization pulses from a switch 118 responding to the indexing of the mold table 12, whereby the valve control 114 is switched "on" as soon as a new row of receptacles is ready to receive the viscid medium from the row of outlets 10. The timer 116 operates to switch "off" the valve control 114 for closing the outlets with such a preadjusted delay that the correct degree of filling of the receptacles is obtained during the "on" period of the valve control unit 114. The corresponding correct length of the "on" period is adjusted by means of a variable closing delay control unit 118, which is set so as to cause the receptacles to be correctly filled.

The output of the properly adjusted closing delay control unit 118 will thus be indicative of the basic operational conditions as giving rise to the desired correct filling of the receptacles during the "on" period of the valve control unit 114, and of these conditions the viscosity of the medium is the one that is the most likely to undergo changes during the following operation hours of the system. However, in operation the average pressure of the medium will be dependent of the viscosity, so the correct setting of the delay control unit 118 will be indicative of the correct magnitude of the pressure of the medium. Now, this output from the unit 118 is supplied to a comparator 120, to which also the pressure guage 112 is connected, such that by the very setting of the unit 118 there is defined an equality between the correct medium pressure as expressed by the output of the unit 118 and the real pressure as measured by the guage 112, whereby the comparator 120 is correspondingly adjusted to a "zero" condition.

As mentioned, the medium pressure is liable to fluctuate considerably during the successive operation cycles, and in order to obtain a reliable basis of comparison from cycle to cycle, the comparator 120 is made operative solely in predetermined short intervals of time in equal sub phases of the successive cycles. To this end the comparator 120 receives the same synchronization signal as supplied to the on/off timer 116 from the indexing switch 118, whereby the comparator is made operable to detect a general change of the pressure level of the viscid medium despite the said operational fluctuations.

Should such a change arise the comparator 120 will supply a corresponding output to a calculator unit 122, which is adapted so as to respond to the change in the second power thereof and produce a corresponding output signal to the on/off timer 116 through a sign adaptor 124 responding to the actual pressure change being positive or negative. The on/off timer 116 is adapted so as to respond to the signal received from the unit 124 by correspondingly increasing or decreasing the delay with which the valve control unit 114 is switched "off" upon the switching "on" thereof, i.e. the operational opening time of the outlet valves will be automatically adjusted to suit the changed viscosity or pressure of the medium so as to produce a substantially unchanged filling of the receptacles 16 during the successive filling cycles.

It will be appreciated that the detailed manner of controlling the effective operation time of the outlet valves may be largely modified within the scope of the invention. Thus, by way of example, the pressure guage 112 and its associated electric or electronic equipment may be adapted so as to effect an integration of the entire pressure variation throughout each operation cycle, whereby any general increase or decrease of the average pressure level is easily detectable as a change in the result of the periodical integration. As another alternative, instead of effectively measuring the medium pressure once during each cycle, the pressure may be measured and compared with the original adjustment in two or more points of each operation phase, e.g. in timed relationship with both the opening and the closing of the outlet valves.

The operation control of the outlet valve means as described above is not limited to a system in which the outlet valves are materially interconnected as by the use of a common valve disc 38 and the same type of control may be effected even if the outlet valves are located as individual units associated with each of the outlets 10 or if use is made of a single valve mounted at the inlet of the distributor 2.

A further and very important aspect of the present invention relates to the cleaning of the distributor unit 2 and its associated outlet conduits. Because the entire system of the invention is primarily adapted for handling of consumable media it is particularly important that the system is cleanable in an effective and simple manner.

In connection with FIG. 3 it has been described that the parts inside the housing 20 are able to be displaced axially, and in FIG. 4 is shown the situation, in which the uppermost cylinder 102 has been actuated to lift the central shaft some short distance, whereby the lower end disc 84 is lifted off the bottom pin 86. By the lifting of the shaft 60, as clearly shown in FIG. 4, the driving member 94 will cause the rotor block 42 and its tubular shaft 46 to be lifted, and the lower end disc 84 correspondingly lifts the valve disc 38 off the bottom of the housing 20 such that in their lifted positions the two parts 42 and 38 are slightly vertically spaced.

The distributor is now ready to be cleaned by water or cleaning liquid simply being pumped through the apparatus, either locally from the inlet 24 or preferably from the inlet end of the entire system and through the freezer 26.

For facilitating the cleaning of the surfaces underneath the rotor block 42, the block 42 is provided with a channel 43 extending from the top side of the block and downwardly and inwardly towards the central area, whereby the cleaning liquid is brought to flow through this area, from which it may flow further to the area underneath the valve disc 38 through the arcuate slot 98. The disc 38 may be provided with further holes for facilitating the passage of the cleaning liquid.

It may be desired to collect or recirculate the cleaning liquid as leaving the outlet end pieces 70, and according to a further and important aspect of the invention the system may be prepared so as to facilitate such an operation. The end pieces 70 are made of rubber or another flexible hose material, and as shown in FIG. 2 there is arranged a cleaning liquid return pipe 71 above and along the row of receptacles 16 in the filling station, i.e. parallel to the row of dispenser outlets. The pipe 71 is provided with a number of connector branches 73, one for each dispenser outlet, and when the cleaning operation shall be initiated the operator simply bends the outlet hoses 70 and connect their free ends to the respective branches 73, whereafter the cleaning may go on with the liquid confined in a closed circuit.

In FIG. 4 it is shown for illustration only that the return pipe 71 is located underneath the outlets from the distributor, but of course the pipe may be arranged in any suitable position, and it may be fixed or removable as desired. It may even allow for the flow of cleaning liquid to be reversed in the system.

Many modifications will be possible within the scope of the invention as defined in the appended claims. As examples, the outlet holes of the distributor may be arranged radially in a peripheral row along the edge of the bottom wall 30 of the housing 20 rather than in this wall itself, and for some media it is unimportant how the distributor is oriented in the space. The distributor 2 should not necessarily include the valve disc 38 or corresponding valve means, as suitable and controllable valves may be located individually adjacent each of the outlets. Under some circumstances the entire valve system may even be constituted by a single valve mounted in the inlet of the distributor. The wings 44 of the rotor 42 would then be able to cooperate directly with the inner ends of the outlet holes 32. The rotor 42 with the wings 44 will not be necessary for all media, but even if it is omitted the valve disc arrangement will still be an advantageous and easily controllabe valve system for many media.

With respect to the discussed pressure responsive adjustment of the effective opening time of the outlet valve means the following extremely important remarks should be considered:

If the supply medium is supplied with an almost constant pressure from a source such as an overhead open supply container, and if the medium is of such a type (viscid or non-viscid) that the general dispensing pressure of the medium inside the distributor 2 is a function practically exclusively of the medium supply pressure, then the correct adjustment of the opening time of the outlet valves means will be a time increase in response to a pressure decrease and vice versa.

However, if the supply medium according to a preferred embodiment of the invention is supplied from or through a positive displacement pump, the constant output of which is and must be very accurately adjusted to correspond to the average material outlet in the filling station, then the correct adjustment of the opening time of the outlet valve means will be exactly inversed compared with the above constant supply pressure example, this being a very significant cognition of the invention, which requires the following explanation:

If a non-viscid liquid is supplied to a filling station through a positive displacement pump operating so as to constantly produce an output corresponding exactly to the average consumption of or outlet in the filling station, then no problems will exist with respect to variations of the correct degree of filling of the receptacles passing the filling station. If on the other hand the supply medium is viscid and if its viscosity is liable to undergo changes during the operation hours of the dispensing system, then the outflow of the medium in the filling station will be immensely influenced by such changes, because the medium outlet flow under given pressure conditions will be intensified considerably when the viscosity of the medium is decreased and retarded considerably when the viscosity is increased.

Correspondingly, the defection of a general rise of the medium pressure in the filling station will be indicative of the medium due to a viscosity change being dispensed at an average rate which is too slow to accomedate the rate of discharge of the positive displacement pump, and the required adjustment of the "on" period of the outlet valve means, therefore, will be an increase of the open period of the valves rather than a decrease as in the above example, and of course a similarly inverted response should correspondingly apply to the detection of a general decrease of the medium pressure.

The positive displacement pump 27 is schematically shown in FIG. 2, and is located adjacent the outlet end of the freezer 26. It is also shown by way of an arrow marked "AIR" that an air flow, in a manner known per se, is supplied to the freezer 26 for being introduced into the viscid material passing through the freezer. This refers to a preferred example, in which articles of the ice cream bar type are produced from a synthetic jelly material which is wanted to show a certain contents of air and which is pronounced viscid until it is finally frozen in the mold receptacles 16 of the mold table 12 (FIG. 1). It will be appreciated that the air content of the jelly material will render the material compressible such that no special expansion means need be provided between the positive displacement pump 27 and the outlet valve means for temporarily taking up the material discharge from the pump 27 during the "close" periods of the outlet valve means, when these periods are of short duration.

What is claimed is:

1. A system for dispensing a viscid medium from a supply medium flow to a plurality of receptacles, the system comprising a filling station and a distributor having an inlet for a pressurized supply medium flow and a plurality of outlets individually connected to a series of dispenser openings located in said filling station, support means for sequentially moving consecutive groups of receptacles through said filling station to align the single receptacles of each group with the respective dispenser openings, outlet valve means located in the path of the medium flow upstream of said dispenser openings, and valve control means operable to repeatingly open and close said valve means to allow concurrent medium outlet from the dispenser openings during an opening time interval corresponding to a predetermined medium volume being dispensed for the required filling of the receptacles of the respective consecutive groups;

pressure sensing means located upstream of said valve means for sensing the pressure of said pressurized medium, and means operatively connected with said pressure sensing means and said valve control means for effectively adjusting the length of said opening time interval as a function of a variation of the average medium pressure between consecutive operation cycles of said valve means, whereby the consecutive receptacles are caused to receive substantially uniform volumes of medium irrespectively of general gradual changes of the pressure of the viscid medium.

2. A system according to claim 1, in which said means for effectively adjusting the length of said opening time interval are additionally operatively connected with said valve control means so as to make said pressure sensing means operative for correction purposes solely during one or more short time intervals representing uniformly phases fractions of the cycle period of the valve operation.

3. A system according to claim 1, in which the valve means are provided as individual valves in each of the outlets of or from the distributor.

4. A system according to claim 3, in which the valve means are provided inside said distributor as a unitary valve member provided with valve holes cooperating with the inner ends of respective outlet holes of the distributor.

5. A system for dispensing a viscid medium from a supply medium flow to a plurality of receptacles, the system comprising a filling station and a distributor having an inlet for a pressurized supply medium flow and a plurality of outlets individually connected to a series of dispenser openings located in said filling station, support means for sequentially moving consecutive groups of receptacles through said filling station to align the single receptacles of each group with the respective dispenser openings, outlet valves means located in the path of the medium flow upstream of said dispenser openings, and valve control means operable to repeatingly open and close said valve means to allow concurrent medium outlet from the dispenser openings during an opening time interval corresponding to a predetermined medium volume being dispensed for the required filling of the receptacles of the respective consecutive groups, said distributor comprising a housing having an inlet and a plurality of outlet holes, inner ends of said outlet holes are located on smooth interior surface portions of a wall of the housing, said distributor housng comprising internal cutter blade means having movable scraper blades and means for moving the scraper blades across the said inner outlet hole ends in scraping contact with said smooth interior surface portions at least immediately around the hole ends, the scraper blades being arranged substantially perpendicular to the plane of the respective hole ends and having a thickness substantially smaller than the diameter of the hole ends, and the scraper blades being ground so as to constitute cutter blades cooperating with the outlet holes edges by the scraping across these edges.

6. A system according to claim 5, in which the outlet holes are arranged in a circular row and the scraper blades are arranged on a rotary body.

7. A system according to claim 6, in which the circular row of outlet holes is arranged in a flat housing wall portion with the inner hole edges located in a common plane.

8. A system according to claim 6 or 7, in which the inner outlet hole ends are operatively constituted by the inner ends of corresponding holes in a displaceable valve member, the scraper blades hereby cooperating with the inner surface of said valve member.

9. A system for dispensing a liquid or viscid medium from a supply medium flow to a plurality of receptacles, the system comprising a filling station and a distributor having an inlet for a supply medium flow and a plurality of outlets individually connected to a series of dispenser openings located in said filling station, support means for sequentially moving consecutive groups of receptacles through said filling station to align the single receptacles of each groups with the respective dispenser openings, outlet valve means located in the path of the medium flow upstream of said dispenser openings, and valve control means operable to repeatingly open and close said valve means to allow concurrent medium outlet from the dispenser openings for dosing out the medium to the individual receptacles of the respective consequtive groups, said dispenser openings being constituted by end holes of respective flexible outermost conduit portions of the outlets from said distributor, said filling station comprising a return pipe which is mounted or mountable so as to extend adjacent a row of said outermost conduit portions and is provided with a corresponding row of connector branches each operable to receive and temporarily hold the outer end of said conduit portions when these are caused to be bent sufficiently for such mounting, said return pipe connected in closed cleaning liquid circuit comprising the said distributor.

10. A system for dispensing a viscid medium from a supply medium flow to a plurality of receptacles the system comprising a filling station and a distributor having an inlet for a pressurized supply medium flow and a plurality of outlets individually connected to a series of dispenser openings located in said filling station, support means for sequentially moving consecutive groups of receptacles through said filling station to align the single receptacles of each group with the respective dispenser openings, and valve control means operable to repeatedly open and close said valve means to allow concurrent medium outflow from the dispenser openings for dosing out the medium to the individual receptacles of the respective consecutive groups;

said distributor being of the type comprising a housing having an inlet and a plurality of outlet holes arranged in a circular row in a planar end wall of the housing and a rotary body located inside the housing rested axially against said end wall, said rotary body being provided with wing members which in operation sweep across the space just in inside front of said outlet holes, said rotary body being mounted axially displaceably between said rested position and an inoperative position spaced from said end wall, and control means being provided for retracting the rotary body into said inoperative position during a cleaning-in-place-cleaning process.

11. A system according to claim 10, in which said end wall of the distributor housing is composed of an outermost rigid end wall and an interior valve disc rested thereagainst, said valve disc having a circular row of valve holes and being rotatable between an open position in which the valve holes are axially flush with the outlet holes in the rigid end wall and a closed position, in which the valve holes are offset from said outlet holes, whereby the said rotary body is rested against the inner side of said valve disc, said retraction control means comprising means for retracting the valve disc from engagement with the rigid end wall as well as retraction of the rotary body from its engagement with the valve disc.

12. A system according to claim 11, in which the retraction control means comprise a central rod having abutment means for effecting the said retraction by axial displacement of the central rod.

13. A system according to claim 1, in which the supply medium flow is supplied to said distributor through a positive displacement pump, an output of the positive displacement pump corresponds substantially exactly to the average medium outlet in said filing station, and in which said means for effectively adjusting the length of said opening time interval are operable to cause the opening time interval of the outlet valve means to be increased or decreased in dependence upon general pressure of the viscid medium.

14. A system according to claim 1, in which the supply medium flow is supplied to said distributor with a substantially constant pressure, and in which said means for effectively adjusting the length of said opening time interval are operable to cause the opening time interval of the outlet valve means to be increased or decreased, respectively, in response to a detection of a decreased or increased general pressure of the supply medium near said outlet valve means.

15. A system according to claim 14, in which an overhead supply container means is provided for supplying the supply flow medium to said distributor.

* * * * *